United States Patent
Li et al.

(10) Patent No.: US 10,452,960 B1
(45) Date of Patent: Oct. 22, 2019

(54) IMAGE CLASSIFICATION

(71) Applicant: TEXAS INSTRUMENTS INCORPORATED, Dallas, TX (US)

(72) Inventors: Yingmao Li, Allen, TX (US); Vikram VijayanBabu Appia, San Jose, CA (US); Ziguo Zhong, Allen, TX (US); Tarek Aziz Lahlou, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/147,966

(22) Filed: Oct. 1, 2018

(51) Int. Cl.
| | |
|---|---|
| *G06K 9/62* | (2006.01) |
| *G06N 7/00* | (2006.01) |
| *G06N 3/08* | (2006.01) |
| *G06T 1/20* | (2006.01) |
| *G06K 9/46* | (2006.01) |

(52) U.S. Cl.
CPC ......... *G06K 9/6292* (2013.01); *G06K 9/4652* (2013.01); *G06K 9/6202* (2013.01); *G06N 3/08* (2013.01); *G06N 7/005* (2013.01); *G06T 1/20* (2013.01)

(58) Field of Classification Search
CPC .. G06K 9/6292; G06K 9/4652; G06K 9/6202; G06T 1/20; G06N 3/08; G06N 7/005
See application file for complete search history.

(56) References Cited

U.S. PATENT DOCUMENTS

2019/0005330 A1* 1/2019 Uhlenbrock ............ G06N 3/02
2019/0080604 A1* 3/2019 Yogamani .......... G06K 9/00805

OTHER PUBLICATIONS

Li, Yingmao et al. "Network Prediction Confidence with Applications to Network Prediction Quality Analysis and Multimodal Fusion in Pixel-wise Labeling Tasks" UT at Dallas.
Hazirbas, Caner et al. "FuseNet: Incorporating Depth into Semantic Segmentation via Fusion-based CNN Architecture." Technical Institute of Munich, Germany.
Wang, Jinghua et al. "Learning Common and Specific Features for RGB-D Semantic Segmentation with Deconvolutional Networks." Aug. 3, 2016.

(Continued)

*Primary Examiner* — Phuoc Tran
(74) *Attorney, Agent, or Firm* — Gregory J. Albin; Charles A. Brill; Frank D. Cimino (57) ABSTRACT

An image classification system includes a convolutional neural network, a confidence predictor, and a fusion classifier. The convolutional neural network is configured to assign a plurality of probability values to each pixel of a first image of a scene and a second image of the scene. Each of the probability values corresponds to a different feature that the convolutional neural network is trained to identify. The confidence predictor is configured to assign a confidence value to each pixel of the first image and to each pixel of the second image. The confidence values correspond to a greatest of the probability values generated by the convolutional neural network for each pixel. The fusion classifier is configured to assign, to each pixel of the first image, a feature that corresponds to a higher of the confidence values assigned to the pixel of the first image and the second image.

20 Claims, 4 Drawing Sheets

(56) References Cited

OTHER PUBLICATIONS

Simonyan, Karen et al. "Very Deep Convolutional Networks for Large-Scale Image Recognition." Published as Conference Paper at ICLR 2015, pp. 1-14.
Yu, Fisher et al. "Multi-Scale Context Aggregation by Dilated Convolutions." Published as Conference Paper at ICLR 2016, pp. 1-13.

* cited by examiner

IMAGE CLASSIFICATION

BACKGROUND

Digital cameras have become commonplace. The digital image data produced by digital cameras can be analyzed and processed by digital image processing techniques. Conventional digital image processing algorithms range from basic image "improvement" processing to optimize exposure, color saturation, and/or sharpness in the image, to the wholesale alteration of image subjects and of the image itself.

In digital image processing, the operation of semantic segmentation refers to the analysis of a digital image to identify features or subjects in the image. In a general sense, semantic segmentation assigns each pixel of an image to a predefined feature or classification. For example, in an image of dogs and cats, semantic segmentation may assign the pixels of each dog in the image to the category "dog," and assign the pixels of each cat in the image to the category "cat."

Semantic segmentation processing may be used in a wide variety of applications (medical imaging, robotics, etc.) to classify the features of a captured image. For example, semantic segmentation may be used in an advanced driver assistance system (ADAS) or autonomous vehicle to process images of the environment in which a vehicle is operating and identify the various features (e.g., road, vehicles, people, etc.) present in the environment.

SUMMARY

A system that identifies features of an image by fusing classification information from two images based on classification confidence values associated with the images is disclosed herein. In one example, an image classification system includes a convolutional neural network, a confidence predictor, and a fusion classifier. The convolutional neural network includes a first processing pipeline and a second processing pipeline. The first processing pipeline is configured to assign a plurality of first probability values to each pixel of a first image of a scene. Each of the first probability values corresponds to a different feature that the convolutional neural network is trained to identify. The second processing pipeline is configured to assign a plurality of second probability values to each pixel of a second image of the scene. Each of the second probability values corresponds to a different feature that the convolutional neural network is trained to identify. The confidence predictor is configured to assign a first confidence value to each pixel of the first image. The first confidence value corresponds to a maximum probability of the first probability values generated for the pixel by the first processing pipeline. The confidence predictor is also configured to assign a second confidence value to each pixel of the second image. The second confidence value corresponds to a maximum probability of the second probability values generated for the pixel by the second processing pipeline. The fusion classifier is configured to assign, to each pixel of the first image of the scene, a feature that corresponds to a higher of the first confidence value assigned to the pixel of the first image and the second confidence value assigned to a corresponding pixel of the second image.

In another example, a method for image classification includes capturing, by a first image sensor, a first image of a scene, and capturing, by a second image sensor, a second image of the scene. A convolutional neural network assigns a plurality of first probability values to each pixel of the first image. Each of the first probability values corresponds to a different feature that the convolutional neural network is trained to identify. The convolutional neural network also assigns a plurality of second probability values to each pixel of the second image. Each of the second probability values corresponds to a different feature that the convolutional neural network is trained to identify. For each pixel of the first image, a first confidence value is determined based on a greatest of the first probability values assigned to the pixel by the convolutional neural network. For each pixel of the second image, a second confidence value is determined based on a greatest of the second probability values assigned to the pixel by the convolutional neural network. A feature value is assigned to each pixel of the first image. The feature value corresponds to a feature associated with a higher of the first confidence value assigned to the pixel of the first image and the second confidence value assigned to a corresponding pixel of the second image.

In a further example, an advanced driver assistance system includes a first image sensor, a second image sensor, and an image processing system. The first image sensor is disposed in a vehicle and is configured to capture a first image of an environment in which the vehicle is operating. The second image sensor is disposed in the vehicle, and is configured to capture a second image of the environment in which the vehicle is operating. The image processing system includes a convolutional neural network, a confidence predictor, and a fusion classifier. The convolutional neural network is configured to assign a plurality of first probability values to each pixel of the first image. Each of the first probability values corresponds to a different feature that the convolutional neural network is trained to identify. The convolutional neural network is also configured to assign a plurality of second probability values to each pixel of the second image. Each of the second probability values corresponds to a different feature that the convolutional neural network is trained to identify. The confidence predictor is configured to assign a first confidence value to each pixel of the first image. The first confidence value corresponding to a greatest of the first probability values generated for the pixel by the convolutional neural network. The confidence predictor is also configured to assign a second confidence value to each pixel of the second image. The second confidence value corresponds to a greatest of the second probability values generated for the pixel by the convolutional neural network. The fusion classifier is configured to assign each pixel of the first image to a feature that corresponds to a higher of the first confidence value assigned to the pixel of the first image and the second confidence value assigned to a corresponding pixel of the second image.

BRIEF DESCRIPTION OF THE DRAWINGS

For a detailed description of various examples, reference will now be made to the accompanying drawings in which.

DETAILED DESCRIPTION

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

Some implementations of sematic segmentation use convolutional neural networks (CNN) to process red, green, blue (RGB) encoded color images. While such segmentation systems can be accurate, use of only RGB information can limit segmentation performance. For example, textures, such as painting, reflections, shadows, and/or other effects captured in an RGB image of a scene, can mislead a CNN and reduce segmentation accuracy. While a reduction in segmentation accuracy is generally undesirable, in safety critical applications failing to accurately identify features of an image can present a highly undesirable hazard.

Implementations of the sematic segmentation system and method presented herein provide improved accuracy by fusing segmentation results from an RGB image of a scene with segmentation results from a depth image of the scene. The RGB image and the depth image are processed separately and independently, with no interaction between the pipelines that process the two images in the CNN. The segmentation system uses the classification probabilities generated by each of the processing pipelines to generate classification confidence values for the highest probability feature classification produced by each pipeline. Utilizing the confidence values generated for the RGB and depth image pixels, the segmentation system replaces low confidence classifications in the RGB image with higher confidence classifications from the depth image.

Figure 1:
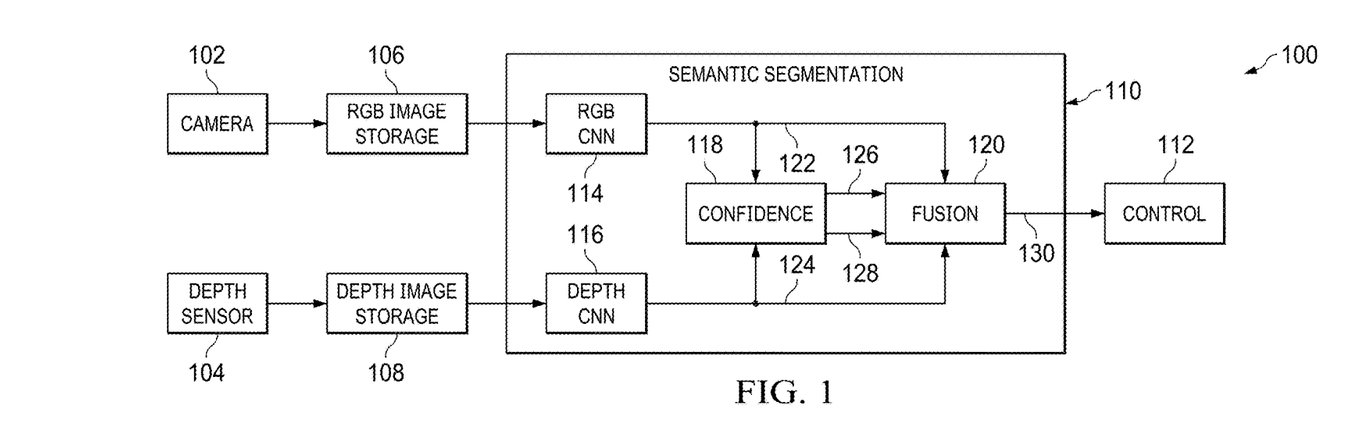
FIG. 1 shows a block diagram for an example of an imaging system that includes semantic segmentation in accordance with the present disclosure.

FIG. 1 shows a block diagram for an example of an imaging system 100 that includes semantic segmentation in accordance with the present disclosure. The imaging system 100 includes a camera 102, a depth sensor 104, RGB image storage 106, depth image storage 108, semantic segmentation subsystem 110, and control subsystem 112. The camera 102 may be in image sensor such as a video camera or still image camera that captures color images and RGB encodes the captured images. RGB images captured by the camera 102 are transferred to the RGB image storage 106 for storage. The semantic segmentation subsystem 110 retrieves RGB images from the RGB image storage 106 for further processing.

The depth sensor 104 is an image sensor that captures images with pixel values that are a function of distance from the depth sensor 104 to an object in the image. For example, pixel luminance in an image produced by the depth sensor 104 is a function of distance to an object. The depth sensor 104 may include any of a variety of systems for measurement of distance from the depth sensor 104 to an object. For example, an implementation of the depth sensor 104 may include an infra-red transmitter and an infra-red receiver. The infra-red transmitter projects a pattern (e.g., a pattern of dots). The infra-red receiver captures images of the projected pattern reflected by an object and determines values of distance to the object based on differences in the reflected pattern. In other implementations, the depth sensor 104 may include a light detection and ranging (LIDAR) system, a radio detection and ranging (RADAR) system, or other imaging system configured to capture depth images. Depth images captured by the depth sensor 104 are transferred to the depth image storage 108 for storage. The semantic segmentation subsystem 110 retrieves depth images from the depth image storage 108 for further processing.

The depth image storage 108 and the RGB image storage 106 may include volatile and/or non-volatile memory for storage of images. In some implementations, the depth image storage 108 and the RGB image storage 106 may be formed in a same storage device. In some implementations of the imaging system 100, the depth sensor 104 may capture images that are smaller (e.g., include fewer pixels) than the images captured by the camera 102. For example, the camera 102 may capture 1024×2048 pixel images and the depth sensor 104 may capture 512×1024 pixel images.

The semantic segmentation subsystem 110 processes the RGB images and the depth images to classify (e.g., assign feature values) to objects in the images. The semantic segmentation subsystem 110 includes a CNN 114 for processing RGB images retrieved from the RGB image storage 106, and a CNN 116 for processing depth images retrieved from the depth image storage 108, a confidence predictor 118, and a fusion classifier 120. In some implementations, the CNN 114 and the CNN 116 may be implemented as different processing pipelines of a single CNN. The CNN 114 is trained to detect specific objects in an RGB image and to classify the objects (e.g., to assign a feature value to each pixel of the image corresponding to the identified object). Similarly, the CNN 116 is trained to detect specific objects in a depth image and to classify the objects (e.g., to assign a feature value to each pixel of the image corresponding to the identified object). The CNN 114 and the CNN 116 operate independently of one another, and can therefore be optimized for classification of the corresponding image type (RGB or depth) and image size.

Figure 2:
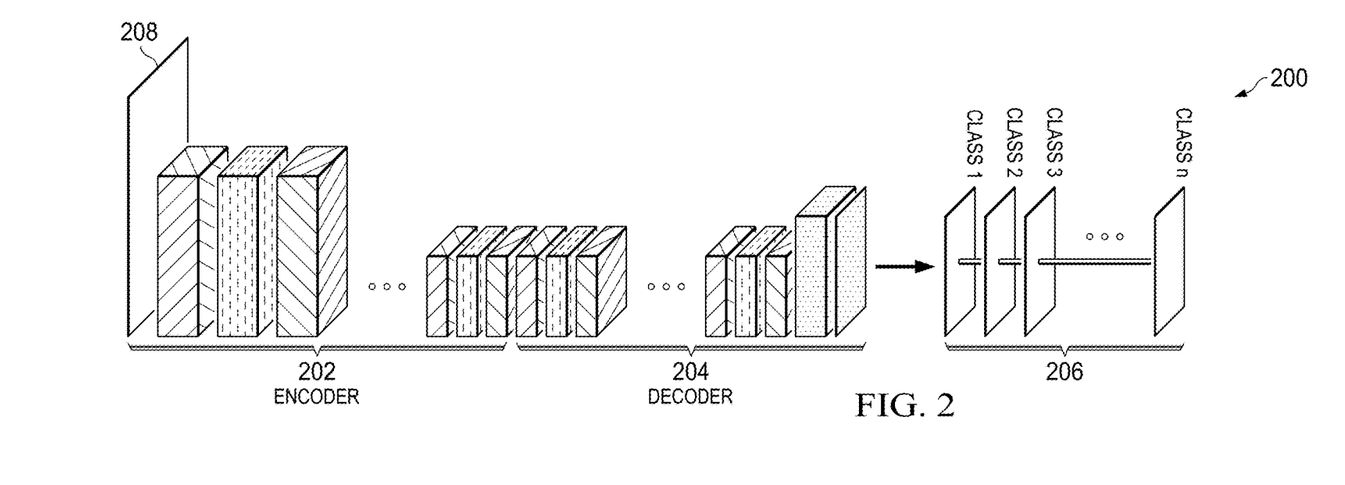
FIG. 2 shows an example of a convolutional neural network suitable for use in semantic segmentation in accordance with the present disclosure.

FIG. 2 shows an example of a CNN 200 suitable for use in semantic segmentation in accordance with the present disclosure. The CNN 200 may be implementation of the CNN 114 and/or the CNN 116. The CNN 200 includes an encoder 202 and a decoder 204. In some examples of the CNN 200, the encoder 202 may be implemented using VGG-16, and the decoder 204 may be implemented using Dilation-10. Description of VGG-16 may be found in Karen Simonyan and Andrew Zisserman, *Very Deep Convolutional Networks for Large-Scale Image Recognition*, April 2015, available at www.arxiv.org/abs/1409.1556. Description of Dilution-10 may be found in Fisher Yu and Vladlen Koltun, Multi-Scale Context Aggregation by Diluted Convolutions, April 2016, available at www.arxiv.org/abs/1511.07122. Other implementations of the CNN 200 may include different a different encoder and/or decoder. The CNN 200 is trained to identify specific objects in an image. For each pixel on an image, the CNN 200 outputs a set of probability values 206. Each of the probability values 206 specifies the probability that the pixel corresponds to a given feature that the CNN 200 is trained to identify. Accordingly, if the CNN 200 is trained to identify 10 different features in an image, then for each pixel of the image the CNN 200 may produce 10 different probability values (e.g., one probability value for each feature). The encoder 202 and the decoder 204 include a plurality of layers that successively process the image 208. The encoder 202 may include an input layer, an output layer, convolutional layers, pooling layers, and normalization layers that produce feature maps corresponding to the image 208. The decoder 204 up-samples the feature maps provided by the encoder 202 and may include a layer corresponding to each layer of the encoder 202. The output of the encoder 202 may be provided to a soft-max classifier that generates the probability values 206 for each pixel.

Figure 3:
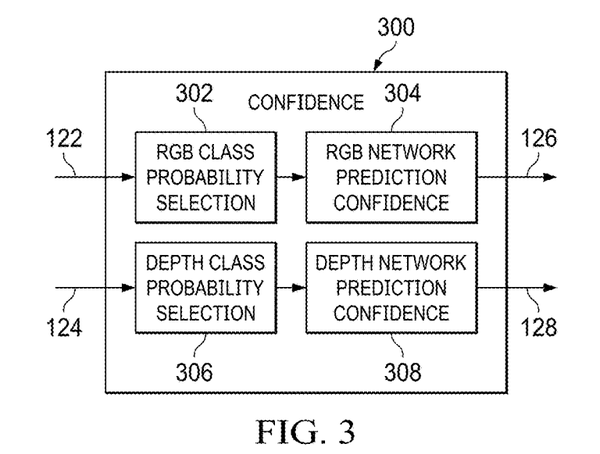
FIG. 3 shows a block diagram for an example of a confidence predictor implemented as part of sematic segmentation in accordance with the present disclosure.

Returning now to FIG. 1, the class probability values 122 generated by the CNN 114 and the class probability values 124 generated by the CNN 116 are provided to the confidence predictor 118. For each pixel of the RGB image processed by the CNN 114, the confidence predictor 118 generates a confidence value based on the class probability values 122 generated by the CNN 114. FIG. 3 shows a block diagram for an example of the confidence predictor 118. The confidence predictor 118 includes RGB class probability selection 302, RGB network prediction confidence 304, depth class probability selection 306, and depth network prediction confidence 308. The RGB class probability selection 302 and the RGB network prediction confidence 304 generate a confidence value for each pixel of the RGB image processed by the CNN 114. The depth class probability selection 306 and the depth network prediction confidence 308 generate a confidence value for each pixel of the depth image processed by the CNN 116. The RGB class probability selection 302 selects probability values from the class probability values 122 for use in determining the confidence of the RGB pixel classification, and the RGB network prediction confidence 304 generates a confidence value that expresses a measure of confidence that the RGB pixel classification is correct. Similarly, the depth class probability selection 306 selects probability values from the class probability values 124 for use in determining the confidence of the depth pixel classification, and the depth class probability selection 306 generates a confidence value that expresses a measure of confidence that the depth pixel classification is correct.

In some implementations of the confidence predictor 118, for each pixel of the RGB image, the RGB class probability selection 302 identifies and selects the two highest probability values of the class probability values 122 and provides the selected values to the RGB network prediction confidence 304. In such implementations, the RGB network prediction confidence 304 computes the confidence value as a ratio of the two highest probability values of the class probability values 122 identified by the RGB class probability selection 302. Thus, for each pixel coordinate m,n of the RGB image, the RGB class probability selection 302 and the RGB network prediction confidence 304 compute a confidence value as:

$$c^{m,n} = \frac{p_1^{m,n}}{p_2^{m,n}} \quad (1)$$

where:

$c^{m,n}$ is the confidence value for the pixel at coordinate m,n;
$p_1^{m,n}$ is the highest classification probability value generated for the pixel at coordinate m,n; and
$p_2^{m,n}$ is the second highest classification probability value generated for the pixel at coordinate m,n.

Similarly, in such implementations of the confidence predictor 118, for each pixel of the depth image, the depth class probability selection 306 identifies and selects the two highest probability values of the class probability values 124 and provides the selected values to the depth network prediction confidence 308. In such implementations, the depth network prediction confidence 308 computes the confidence value as a ratio of the two highest probability values of the class probability values 124 identified by the depth network prediction confidence 308. Thus, for each pixel coordinate m,n of the depth image, the depth class probability selection 306 and the depth network prediction confidence 308 compute a confidence value as per equation (1).

Figure 4:
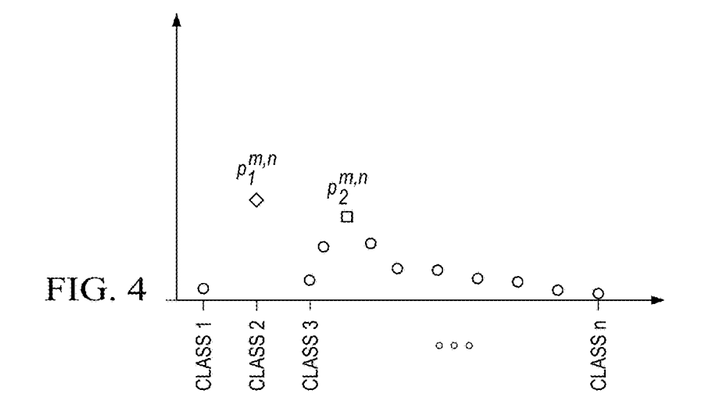
FIGS. 4 and 5 shows examples of probabilities for different classes in an RGB image and a depth image as applied in confidence prediction in accordance with the present disclosure.

FIG. 4 shows an example of the class probability values 122 generated by the CNN 114 for a pixel of an RGB image. In this example, the highest probability value $p_1^{m,n}$ is only slightly greater than the second highest probability value $p_2^{m,n}$. Accordingly, the confidence value $c^{m,n}$ generated by the RGB network prediction confidence 304 for this pixel will be relatively small (e.g., close to one).

Figure 5:
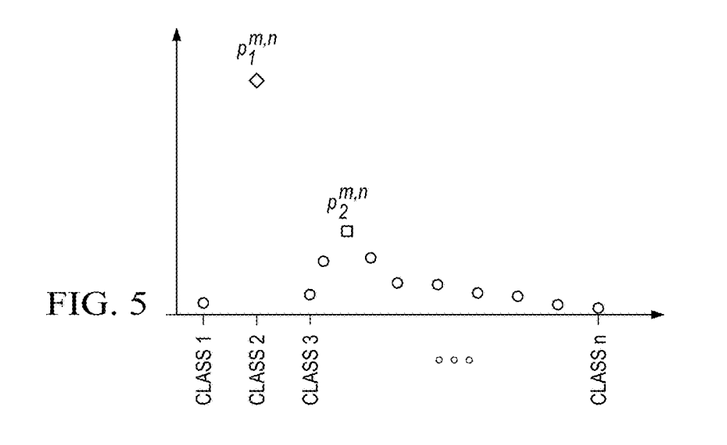

FIG. 5 shows an example of the class probability values 124 generated by the CNN 116 for a pixel of a depth image. In this example, the highest probability value $p_1^{m,n}$ is substantially greater than the second highest probability value $p_2^{m,n}$. Accordingly, the confidence value $c^{m,n}$ generated by the depth network prediction confidence 308 for this pixel will be relatively large (in comparison to the confidence value generated for the corresponding pixel of the RGB image based on the probability values class probability values 122 of FIG. 4).

Figure 6:
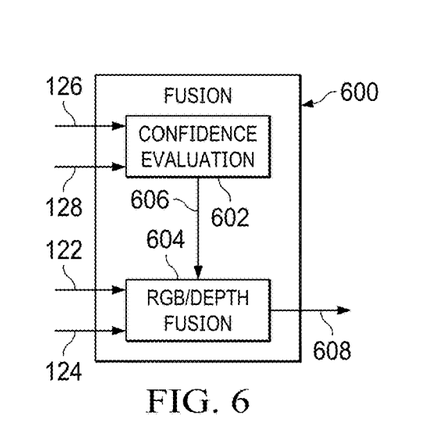
FIG. 6 shows a block diagram for an example of a fusion classifier implemented as part of sematic segmentation in accordance with the present disclosure.

The RGB classification confidence values 126 and the depth classification confidence values 128 generated by the confidence predictor 118 are provided to the fusion classifier 120. The class probability values 122 and the class probability values 124 are also provided to the fusion classifier 120. The fusion classifier 120 selects a classification value for each pixel of the RGB image from the class probability values 122 and the class probability values 124 based on the RGB classification confidence values 126 and the depth classification confidence values 128. FIG. 6 shows a block diagram for an example of a fusion classifier 600. The fusion classifier 600 is an implementation of the fusion classifier 120. The fusion classifier 600 includes confidence evaluation 602 and RGB/depth fusion 604. The confidence evaluation 602 receives the RGB classification confidence values 126 and the depth classification confidence values 128 generated by the confidence predictor 118, and based on the RGB classification confidence values 126 and the depth classification confidence values 128 determines whether a pixel is to be assigned the classification corresponding to the highest probability value produced for the pixel by the CNN 114 (i.e., the RGB classification) or assigned the classification corresponding to the highest probability value produced for the pixel by the CNN 116 (i.e., the depth classification). For example, in some implementations, if the depth classification confidence value for a pixel is greater than the RGB classification confidence value for the pixel, then the confidence evaluation 602 selects the depth classification for the pixel, and if the RGB classification confidence value for the pixel is greater than the depth classification confidence value for the pixel then the confidence evaluation 602 selects the RGB classification for the pixel.

In some implementations of the fusion classifier 600, the RGB/depth fusion 604 applies thresholds to the RGB classification confidence values 126 and the depth classification confidence values 128 to identify low confidence pixel classifications and high confidence pixel classifications. For example, the classification confidence for a pixel may be low if the confidence value for the pixel is below a low confidence threshold. Similarly, the classification confidence for a pixel may be high if the confidence value for the pixel is above a high confidence threshold. If the RGB classification confidence value for the pixel is low, and the depth classification confidence value for the pixel is high, then the confidence evaluation 602 may select the depth classification for pixel, and otherwise select the RGB classification for the pixel. The confidence based classification selections 606 (e.g., RGB or depth classification) are provided to the RGB/depth fusion 604.

The RGB/depth fusion 604 combines the semantic segmentation produced by the CNN 114 and the semantic segmentation produced the CNN 116 to provide a fused segmentation 608 that may provide better accuracy than is produced by either the CNN 114 or the CNN 116 alone. The fused segmentation replaces lower confidence pixel classifications produced by the CNN 114 with higher confidence pixel classifications produced by the CNN 116. For example, the confidence based classification selections 606 may represent a confidence mask that specifies for each pixel of a segmented image, whether the RGB classification or the depth classification is to be assigned to the pixel. The RGB/depth fusion 604 assigns classification values to the pixels of the fused segmentation 608 based on the confidence based classification selections 606.

Figure 7:
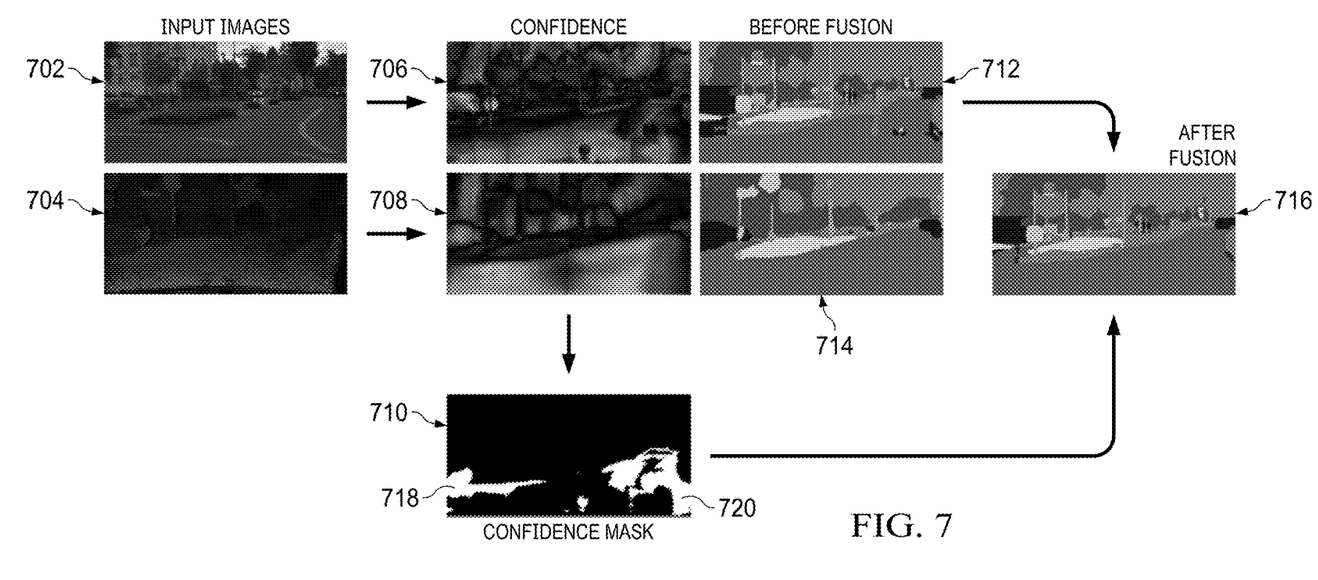
FIG. 7 shows an example of sematic segmentation that fuses red-green-blue and depth image classifications based on classification confidence in accordance with the present disclosure.

FIG. 7 shows an example of sematic segmentation that fuses RGB classifications and depth classifications based on the confidence based classification selections 606. In FIG. 7, an RGB image 702 is retrieved from the RGB image storage 106 and processed by the CNN 114 to generate the class probability values 122. Similarly, the depth image 704 is retrieved the depth image storage 108 and processed by the CNN 116 to generate the class probability values 124. Segmentation produced based only on the class probability values 122 is shown as image 712, and segmentation produced based only on the class probability values 124 is shown as image 714.

The confidence predictor 118 processes the class probability values 122 to generate a classification confidence value for each pixel of the RGB image 702, and processes the class probability values 124 to generate a classification confidence value for each pixel of the depth image 704. In aggregate, the classification confidence values for the RGB image 702 are represented by the confidence image 706, and the classification confidence values for the RGB image 702 are represented by the confidence image 708. The confidence predictor 118 generates the confidence mask 710 based on the classification confidence values of the confidence image 706 and the confidence image 708. For example, in the confidence mask 710, the lighter areas 718, 720, and the like represent pixels of the RGB image 702 for which the confidence image 706 represents lower confidence than the confidence image 708. Accordingly, to produce the fused segmentation 716, the fusion classifier 120 applies classification values specified in the image 714 in place of the classification values specified in the image 712 in the areas of the image 712 corresponding to the areas 718 and 720 of the confidence mask 710. By replacing lower confidence classifications in the image 712 with higher confidence classifications from the image 714, the fused segmentation 716 may be more accurate than the image 712 or the image 714.

Referring again to FIG. 1, the fused segmentation 130 generated by the semantic segmentation subsystem 110 is provided to the control subsystem 112. The operations performed by the control subsystem 112 vary in different implementations of the imaging system 100. For example, the imaging system 100 may be implemented as part of an advanced driver assistance system (ADAS) or as part of an automated vehicle. In such implementations, the control subsystem 112 applies the fused segmentation 130 to control various vehicle systems based on the objects identified in the fused segmentation 130. The control subsystem 112 may activate a vehicle braking system to reduce vehicle speed based on an object identified in the fused segmentation 130, or may active a vehicle steering system to adjust vehicle direction based on an object identified in the fused segmentation 130. In various implementations of the imaging system 100, the control subsystem 112 applies the fused segmentation 130 to modify the operation of a higher level system.

In various implementations of the imaging system 100, semantic segmentation subsystem 110 may be implemented as one or more microprocessors, such as a general purpose microprocessor, a graphics processing unit, a digital signal processor, etc. and instructions stored in a non-transitory computer readable medium. The processor(s) executes the instructions to form and provide the functionality of the semantic segmentation subsystem 110 as disclosed herein. Imagining system 100 and/or segmentation subsystem 110 may be implemented as one or more integrated circuits and/or as a system on a chip (SoC).

Figure 8:
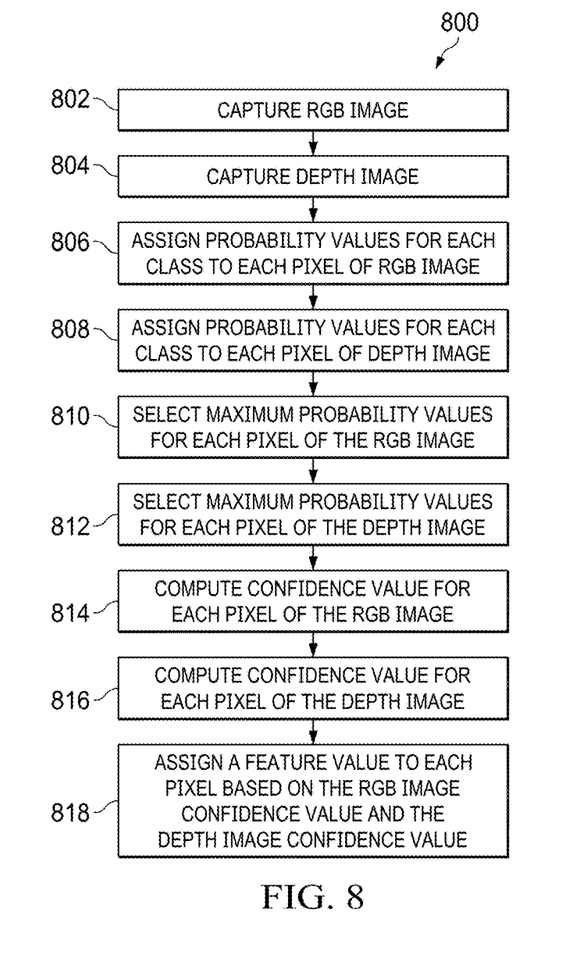
FIG. 8 shows a flow diagram for an example of method for semantic segmentation in accordance with the present disclosure.

FIG. 8 shows a flow diagram for an example of method 800 for semantic segmentation in accordance with the present disclosure. Though depicted sequentially as a matter of convenience, at least some of the actions shown can be performed in a different order and/or performed in parallel. Additionally, some implementations may perform only some of the actions shown. Operations of the method 800 may be performed by implementations of the imaging system 100.

In block 802, the camera 102 captures an RGB image of the environment in which the imaging system 100 is operating. The RGB image may be stored in the RGB image storage 106.

In block 804, the depth sensor 104 captures a depth image of the environment in which the imaging system 100 is operating. The depth image may be stored in the depth image storage 108.

In block 806, the RGB image is processed by the CNN 114. The CNN 114 assigns a probability value to each pixel for each feature (class) that the CNN 114 is trained to identify. For example, if the CNN 114 is trained to identify 10 different features, then the CNN 114 assigns 10 probability values to each pixel, where each of the probability values represents a likelihood that the pixel is part of a corresponding feature.

In block 808, the depth image is processed by the CNN 116. The CNN 116 assigns a probability value to each pixel for each feature (class) that the CNN 116 is trained to identify. The CNN 116 may be trained to identify the same features as the CNN 114.

In bock 810, the confidence predictor 118 selects the maximum probability values assigned by the CNN 114 to each pixel of the RGB image. In some implementations, for each pixel of the RGB image, the confidence predictor 118 selects the highest probability value and the next highest probability assigned to the pixel.

In bock 812, the confidence predictor 118 selects the maximum probability values assigned by the CNN 116 to each pixel of the depth image. In some implementations, for each pixel of the depth image, the confidence predictor 118 selects the highest probability value and the next highest probability assigned to the pixel.

In block 814, the confidence predictor 118 applies the maximum probability values for the RGB image pixels to generate a confidence value for the classification of each pixel of the RGB image. For example, the confidence predictor 118 may compute the confidence value for each pixel as a ratio of the highest probability value to the next highest probability value for the pixel.

In block 816, the confidence predictor 118 applies the maximum probability values for the depth image pixels to generate a confidence value for the classification of each pixel of the depth image. For example, the confidence predictor 118 may compute the confidence value for each pixel as a ratio of the highest probability value to the next highest probability value for the pixel.

In block 818, the fusion classifier 120 assigns a feature value (a class) to each pixel based on the confidence values for the RGB image pixels and the confidence values for the depth image pixels. For example, the fusion classifier 120 fuses the RGB segmentation generated by the CNN 114 and the depth segmentation generated by the CNN 116 based on the classification confidence values for the pixels of each image. For example, the fusion classifier 120 may assign a feature value to each pixel corresponding to the feature associated with the higher of the RGB classification confidence value or the depth classification confidence value. In some implementations, replacement of an RGB classification by a depth classification may be based on the RGB classification confidence value being below a low confidence threshold and the depth classification confidence value being above a high confidence threshold.

The fused segmentation generated by the fusion classifier 120 may be used to control the operation of a higher level system based on the classifications presented by the fused segmentation.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An image classification system, comprising:
a convolutional neural network comprising:
  a first processing pipeline configured to assign a plurality of first probability values to each pixel of a first image of a scene, each of the first probability values corresponding to a different feature that the convolutional neural network is trained to identify;
  a second processing pipeline configured to assign a plurality of second probability values to each pixel of a second image of the scene, each of the second probability values corresponding to a different feature that the convolutional neural network is trained to identify;
a confidence predictor configured to:
  assign a first confidence value to each pixel of the first image, the first confidence value determined based on a maximum probability value of the first probability values generated by the first processing pipeline for the pixel;
  assign a second confidence value to each pixel of the second image, the second confidence value determined based on a maximum probability value of the second probability values generated by the second processing pipeline for the pixel; and
a fusion classifier configured to assign, to each pixel of the first image of the scene, a feature value that corresponds to a higher of the first confidence value assigned to the pixel of the first image and the second confidence value assigned to a corresponding pixel of the second image.

2. The image classification system of claim 1, wherein the first image is encoded using red, green, and blue (RGB) color components, and the first processing pipeline is configured to process RGB images.

3. The image classification system of claim 1, wherein the second image is encoded with depth information, and the second processing pipeline is configured to process depth images.

4. The image classification system of claim 1, wherein the first processing pipeline is independent of the second processing pipeline.

5. The image classification system of claim 1, wherein the confidence predictor is configured to:
compute the first confidence value assigned to each pixel of the first image as a ratio of two highest first probability values generated for the pixel of the first image; and
compute the second confidence value assigned to each pixel of the second image as a ratio of two highest second probability values generated for the pixel of the second image.

6. The image classification system of claim 1, wherein, for each pixel in the first image, the fusion classifier is configured to replace a feature assigned a lower first confidence value in the first image with a feature corresponding to a higher second confidence value of a corresponding pixel in the second image.

7. The image classification system of claim 1, wherein the fusion classifier is configured to assign a pixel of the first image to a feature assigned to a corresponding pixel in the second image based on the second confidence value assigned to the pixel of the second image exceeding a threshold value.

8. A method for image classification, comprising:
capturing, by a first image sensor, a first image of a scene;
capturing, by a second image sensor, a second image of the scene;
assigning, by a convolutional neural network, a plurality of first probability values to each pixel of the first image, each of the first probability values corresponding to a different feature that the convolutional neural network is trained to identify;
assigning, by the convolutional neural network, a plurality of second probability values to each pixel of the second image, each of the second probability values corresponding to a different feature that the convolutional neural network is trained to identify;

determining a first confidence value for each pixel of the first image based on a greatest of the first probability values assigned to the pixel by the convolutional neural network;

determining a second confidence value for each pixel of the second image based on a greatest of the second probability values assigned to the pixel by the convolutional neural network; and assigning, to each pixel of the first image, a feature value corresponding to a higher of the first confidence value assigned to the pixel of the first image and the second confidence value assigned to a corresponding pixel of the second image.

9. The method of claim 8, further comprising encoding the first image as red, green, and blue color components, wherein the first image sensor is a color camera.

10. The method of claim 8, further comprising encoding the second image as depth information, wherein the second image sensor is a depth sensor.

11. The method of claim 8, wherein assigning the first probability values to the first image is independent of assigning the second probability values to the second image.

12. The method of claim 8, wherein the first image comprises a greater number of pixels than the second image.

13. The method of claim 8, further comprising assigning, to a pixel of the first image, a feature assigned to a corresponding pixel in the second image based on the second confidence value assigned to the pixel of the second image exceeding a threshold value.

14. An advanced driver assistance system (ADAS), comprising:
a first image sensor, disposed in a vehicle, configured to capture a first image of an environment in which the vehicle is operating;
a second image sensor, disposed in the vehicle, configured to capture a second image of the environment in which the vehicle is operating;
a semantic segmentation system, comprising:
a convolutional neural network, configured to:
assign a plurality of first probability values to each pixel of the first image, each of the first probability values corresponding to a different feature that the convolutional neural network is trained to identify; and
assign a plurality of second probability values to each pixel of the second image, each of the second probability values corresponding to a different feature that the convolutional neural network is trained to identify;
a confidence predictor configured to:
assign a first confidence value to each pixel of the first image, the first confidence value determined based on a greatest of the first probability values generated for the pixel by the convolutional neural network;
assign a second confidence value to each pixel of the second image, the second confidence value determined based on a greatest of the second probability values generated for the pixel by the convolutional neural network; and
a fusion classifier configured to assign each pixel of the first image to a feature that corresponds to a higher of the first confidence value assigned to the pixel of the first image and the second confidence value assigned to a corresponding pixel of the second image.

15. The ADAS of claim 14, wherein:
the first image sensor is a color camera configured to capture a red, green, and blue (RGB) image;
the first image is encoded using RGB color components; and
the convolutional neural network is configured to process RGB images.

16. The ADAS of claim 15, wherein:
the second image sensor is a depth sensor configured to measure distance;
the second image is encoded with distance information; and
the convolutional neural network is configured to process distance information.

17. The ADAS of claim 14, wherein the confidence predictor is configured to:
compute the first confidence value assigned to each pixel of the first image as a ratio of two highest first probability values generated for the pixel of the first image; and
compute the second confidence value assigned each pixel of the second image as a ratio of the two highest second probability values generated for the pixel of the second image.

18. The ADAS of claim 14, wherein the convolutional neural network is configured to cross couple no information between assignment of the plurality of first probability values of the first image and assignment of the plurality of second probability values of the second image.

19. The ADAS of claim 14, further comprising a vehicle control system configured to control the vehicle based on the features assigned to the first image by the fusion classifier.

20. The ADAS of claim 14, wherein the fusion classifier is configured to assign a pixel of the first image to a feature assigned to a corresponding pixel in the second image based on the second confidence value assigned to the pixel of the second image exceeding a threshold value.

* * * * *